United States Patent Office 3,357,787
Patented Dec. 12, 1967

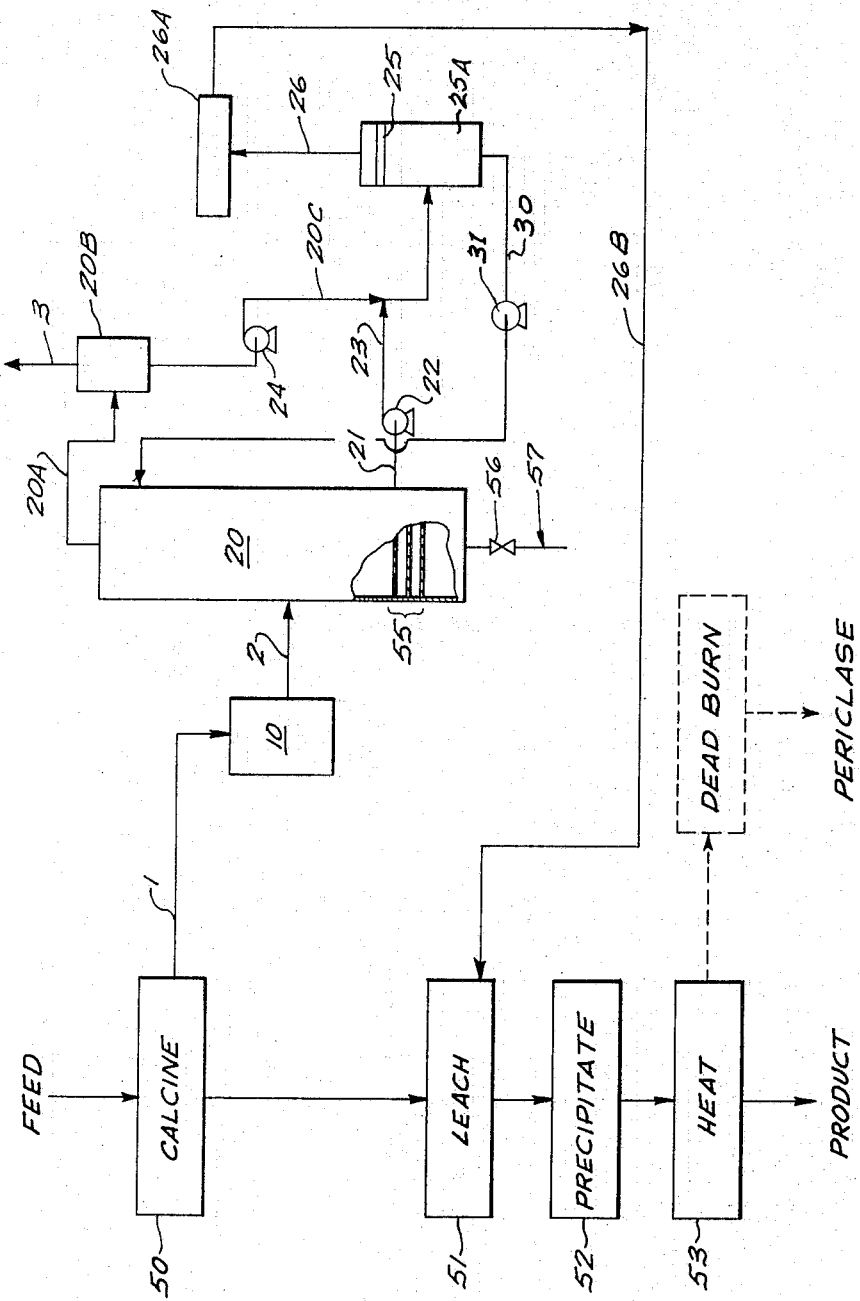

3,357,787
PRODUCTION OF MAGNESIUM CARBONATE
AND MAGNESIA
Edward Einstein, Bethel Park, Pa., assignor to Harbison-Walker Refractories Company, Pittsburgh, Pa., a corporation of Pennsylvania
Filed Sept. 16, 1965, Ser. No. 487,792
3 Claims. (Cl. 23—67)

ABSTRACT OF THE DISCLOSURE

Manufacture of magnesia or magnesium carbonate by carbonate process principles in which necessary $CO_2$ is recovered from an initial calcination stage and scrubbed with an aqueous-amine solution to remove sulfur values and magnesite dust.

---

This invention relates generally to processes for the recovery of magnesian values from materials containing them by use of principles involved in the so-called "carbonate" process.

In general, the carbonate process is quite old. It usually consists of a sequential series of steps including an initial calcination, followed by a leaching of magnesian values from the calcined material in the presence of carbon dioxide gas, followed by a separation of dissolved magnesian values from solid gangue material. The dissolved magnesian values are precipitated in the form of a magnesium carbonate as by agitation, heating, boiling, a combination of the foregoing, and the like. The precipitated magnesium carbonate thereafter is heated to produce such as light, fluffy, very high purity, magnesium carbonate, or magnesia. In some instances, the recovered material is further heat-treated to produce a periclase grain suitable for use in the production of refractories.

One of the oldest patents, of which we are aware, relating to the carbonate process is United States Patent No. 303,962, which issued in 1884. It generally discloses a carbonate-type process of the type above described, and further teaches the use of caustic magnesia as an aid in precipitating the magnesian values. United States Patent No. 689,345 of 1901 discloses use of calcined magnesite to assist in precipitation. United States Patent No. 935,418 of 1909 discloses recirculation of precipitated carbonate hydrate to assist in initial precipitation.

United States Patent 694,424 of 1902 and United States Patent 1,361,325 of 1920 are examples of prior art leaching procedures, in which such leaching is carried out under pressure. We call this step "leaching," while the prior art sometimes terms it a "carbonation" stage. United States Patent No. 734,030 of 1903 is an excellent disclosure of very early teachings of a tower-type gas-liquid contact apparatus for the carbonating or leaching step, in which $CO_2$ gas is introduced into the bottom of a tower and a magnesium hydroxide slurry is fed into the top of the same tower, whereby countercurrent contact is induced and the magnesian values are dissolved or leached from the feed.

United States Patent No. 1,864,063 merits attention for its disclosure of the importance of maintaining a temperature in the range 70–80° F. for the bicarbonate liquor in a carbonate stage to prevent early and undesired precipitation of the magnesian values from solution.

United States Patent No. 2,396,915 is of interest for its disclosure of a precipitating stage which is held under reduced pressure as a means of achieving more rapid and complete precipitation.

In the practice of the carbonate process it is essential that $CO_2$ gas be utilized. A common source has been values recovered from flue gases evolving from a kiln in which magnesium carbonate rock or the like is heat-treated. For example, it can be $CO_2$ gas recovered from the initial calcination of the feed to a carbonate process. United States Patent No. 2,386,389 is exemplary of a prior art teaching of recovering $CO_2$ values from the flue gases evolving from a kiln.

Rather complete disclosures and prior art discussions of the overall carbonate process are found in United States Patent No. 1,034,330 of 1912, No. 1,101,772 of 1914, and No. 1,361,324 of 1920. These patents, among other things, disclose very early knowledge of a carbonate process including crushing, calcination, recovery of flue gas, enrichment of recovered flue gas with $CO_2$, selective calcination of the magnesian values of feed, slaking of selectively calcined material, seeding the precipitating stage with calcined magnesia, mechanical separation of a precipitate from the precipitation stage by filtration, leaching under pressure, and the like. As can be seen by this lengthy and rather detailed discussion of prior art patents, contemporary advances in the art of manufacturing high purity magnesia by the carbonate process are almost exclusively limited to what sometimes would appear rather minor variations in control of the operating parameters of the various stages of the process, selection of raw materials, and the like; for example, discovery and teaching of optimum calcination temperatures, sizing of feed, pH and concentration of materials through the various stages, temperature of the various stages, and the like.

The present invention is primarily concerned with the initial leaching stage. In the past, there has been difficulty in providing adequate $CO_2$ gas, as far as purity is concerned, economically. Many have taught recovery of flue gas as a source of $CO_2$. This gas quite often is highly contaminated with undesirable constituents. A particularly noxious contaminant in carbon dioxide gases previously used has been sulfur evolving from fuels used to fire the kilns from which flue gas is recovered. Finely divided dust is another troublesome contaminant.

It is an object of this invention to provide an improved method of operating a leaching stage in a carbonate process whereby the problem of undesirable sulfur contaminants and dust are effectively eliminated in the use of treated flue gas as a source of $CO_2$.

Briefly, according to one aspect of this invention, there is provided a novel arrangement for leaching magnesian values from a calcined magnesium carbonate rock. Effluent flue gas from an available kiln is passed through an amine treatment. The amine treatment removes substantially all $CO_2$ values from the flue gas. The amine treatment includes means arranged to substantially eliminate problems of sulfur in the form of $SO_2$ and fine dust as are found in effluent gases from kilns used to calcine carbonate rock.

A better understanding of the invention and further features and advantages thereof will be readily apparent from a study of the following detailed description, with reference to the appended drawing. This drawing is a schematic flow diagram of a carbonate process according to the concepts of this invention.

Before describing the drawing in detail, it should be understood it is but exemplary of practice of the present invention, and that modification thereof may be had which would still be within the spirit and scope of the present invention. Further, it should be understood that the true spirit and scope of the invention is as defined in the hereafter appended claims.

In the drawing there is shown a conduit 1 arranged to carry hot flue gas from an adjacent calciner or rotary-like kiln 50 in which magnesite rock is calcined. Preferably, the gas has been cooled to a low temperature. Calcined feed then passes sequentially through the leaching stage 51, precipitation stage 52, and heating stage 53. Preferably, this gas is passed through cooler 10 to reduce the temperature to more on the order of 100° F. Of course, cooling can be accomplished in any conventional manner, for example, the common bent tube variety in which water is recirculated through a series of pipes encapsulated in a shell, and hot gas is passed in a tortuous path over the tubes.

In any event, relatively cooler flue gas, on the order of 100° F. in temperature, is passed through conduit 2 to the bottom of an absorber 20. In the absorber the $CO_2$ gas is absorbed in a water and amine solution. A preferred amine is monoethanolamine.

Stripped flue gas passes through line 20A to a stripper 20B. Denuded flue gas (i.e. flue gas with substantially all $CO_2$ gas removed) exits from the stripper through the line 3. Condensed water vapor, and such amine and $CO_2$ gases as it might carry, exit through the line 20C.

The main stream of $CO_2$-saturated amine solution passes through line 21 and pump 22 to the line 23 where it is mixed with the effluent of line 20C. Pump 24 in the line 20C assures mingling of these two streams. The material in line 23 passes to the regenerative still 25A. In the regenerative still, substantially pure $CO_2$ gas separated from the amine; and it passes through the mechanical filter 25 to remove practically all water vapor. It is then passed through a line or conduit 26 to cooler 26A. The purified, cooled, (less than 100° F. and preferably less than 70° F.) and dried gas is then introduced to the leaching stage 51 via line 26B. The amine and water solution, free of $CO_2$ gas, is recovered from the bottom of the regenerative still and passed through line 30 under the action of pump 31 and returned to the top of the absorber 20.

The absorber 20 is the most important part of the system. It can be compared to a multi-plate distillation column in which the amine solution, introduced through line 30, tumbles downwardly over column plates in countercurrent flow to the flue gas introduced through the line 2. A lowermost group of the plates 55 is arranged to have contained material periodically wasted. These lowermost plates define a reaction zone in which magnesian dust in the flue gas and $SO_2$ react to form an insoluble magnesium sulfate. It is necessary that the pH of these lower plates which define the reaction zone be basic, and to this end it is sometimes desirable to add a small amount of sodium carbonate. Thus, the $CO_2$ gas evolving through line 20A is free of undesirable dust and $SO_2$. In order to assure that the $CO_2$-enriched amine leaving the absorber through line 21 is substantially free of precipitated magnesium sulfate, the line enters the absorber in a position above the place of introductiton of the flue gas. Valve 56 in line 57 is periodically opened to allow washing out of the magnesium sulfate.

In the preferred mode of practicing our carbonate process, magnesite (magnesium carbonate rock) is crushed to on the order of $-\frac{1}{2}+10$ mesh (i.e., substantially all particles are smaller than $\frac{1}{2}''$ and rest on a 10 mesh screen). The crushed material is passed through a calcination stage where it is heated to a temperature in the range 1200–1300° F. Evolving $CO_2$ gas is passed through the line 1 to the amine treatment wherein $CO_2$ gas is recovered and purified and reintroduced through line 5 to the leaching stage where it passes in countercurrent flow to a slurry of the calcined magnesite. The calcined magnesite should be cooler than 100° F. where it contacts the $CO_2$ gas. It should be 100% $-65$ mesh. Satisfactory amine-water solutions I suggest range from about 10 to about 20 parts by weight of amine and 90 to 80 parts water. Actually, the concentration of amine is quite flexible being a function of pumping rate, $CO_2$ concentration in the flue gas, size of equipment, etc. Further, amines other than monoethanolamine which are soluble in water and selective for $CO_2$ gas can be used.

It is preferred that the leaching stage be pressurized to on the order of at least 10 lb. per sq. in. pressure. Effluent from the leaching step is passed to a thickener, wherein solids and waste gangue are removed from an effluent stream. The effluent is passed to a precipitation stage where it is subjected to agitation, heating, boiling, or the like (I prefer vigorous agitation), and a solid magnesium carbonate precipitant is recovered. The solid magnesium carbonate slurry is then passed to a heating and drying stage. If it is desired to obtain a dry, low density (on the order of 5 or 6 p.c.f.), 99.9+% pure magnesia, the material is heated to a temperature in the range 200 to 800° F. If it is desired to produce a refractory grade periclase the material is passed through an initial calcination on the order of 1500–2200° F. and then briquetted and passed to a dead burning stage as, for example, in the manner disclosed and claimed in United States Patent No. 3,060,000.

Having thus described the invention in detail and with sufficient particularity as to enable those skilled in the art to practice it, what is desired to have protected by Letters Patent is set forth in the following claims:

I claim:
1. In those methods of producing high-purity materials selected from the group consisting of magnesium carbonate and magnesia according to the carbonate process and in which required $CO_2$ gas is recovered from flue gas emanating from a preliminary calcination of natural carbonate rock containing magnesian values, the improvement which comprises cooling said gas below about 100° F., passing the cooled flue gas to a reaction zone where it is in intimate association with an aqueous amine-containing stream selective for the $CO_2$ gas in said flue gas while simultaneously removing sulfur values and fine magnesite dust from the flue gas as insoluble precipitate, maintaining a basic pH in said reaction zone, removing the insoluble precipitate from said reaction zone, removing the $CO_2$ from the stream containing it and passing the $CO_2$ to a leaching stage containing an aqueous slurry of the calcined carbonate rock, thereby precipitating said high-purity material.

2. The method of claim 1 in which the amine is monoethanolamine.

3. The method of claim 1 in which sodium carbonate is added to the aqueous amine containing stream to aid in removing the magnesite dust and sulfur values.

References Cited

UNITED STATES PATENTS

| | | | |
|---|---|---|---|
| Re 18,958 | 9/1933 | Bottoms | 23—2.3 |
| 1,034,330 | 7/1912 | Young | 23—67 |
| 1,356,907 | 10/1920 | Collings et al. | 23—128 |
| 2,209,752 | 7/1940 | Abrahams | 23—67 |
| 2,238,955 | 10/1945 | Tomlinson | 23—48 X |
| 2,592,762 | 4/1952 | Taylor et al. | 23—2.3 |
| 3,261,662 | 7/1966 | Axelsson | 23—48 |

MILTON WEISSMAN, *Primary Examiner.*

OSCAR R. VERTIZ, *Examiner.*

G. T. OZAKI, *Assistant Examiner.*